United States Patent
Tonouchi et al.

(10) Patent No.: US 11,854,214 B2
(45) Date of Patent: Dec. 26, 2023

(54) INFORMATION PROCESSING APPARATUS SPECIFYING A RELATIONSHIP BETWEEN A SENSOR AND AN OBJECT INCLUDED IN IMAGE DATA, AND METHOD AND NON-TRANSITORY COMPUTER-READABLE STORAGE MEDIUM

(71) Applicant: KABUSHIKI KAISHA TOSHIBA, Tokyo (JP)

(72) Inventors: Yojiro Tonouchi, Inagi Tokyo (JP); Yasunobu Yamauchi, Yokohama Kanagawa (JP); Tsukasa Ike, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 177 days.

(21) Appl. No.: 17/461,596

(22) Filed: Aug. 30, 2021

(65) Prior Publication Data

US 2022/0292694 A1 Sep. 15, 2022

(30) Foreign Application Priority Data

Mar. 9, 2021 (JP) .................. 2021-037437

(51) Int. Cl.
  *G06T 7/246* (2017.01)
  *G06T 7/73* (2017.01)
  *G06V 20/52* (2022.01)

(52) U.S. Cl.
  CPC ............ *G06T 7/251* (2017.01); *G06T 7/73* (2017.01); *G06V 20/52* (2022.01)

(58) Field of Classification Search
  CPC .. G06T 7/251; G06T 7/73; G06T 7/20; G06T 7/75; G06T 2207/10016; G06T 2207/30196; G06V 20/52; G06V 40/103; G06V 40/20; G06F 18/22; G06F 2218/00
  See application file for complete search history.

(56) References Cited

U.S. PATENT DOCUMENTS

2013/0325887 A1  12/2013  Takaoka
2018/0350084 A1*  12/2018  Tamir ............... G06T 7/292

FOREIGN PATENT DOCUMENTS

| JP | 5147036 B2 | | 12/2012 | |
| JP | 2013-025578 | * | 2/2013 | ........... G05B 19/418 |
| JP | 5994397 B2 | | 9/2016 | |
| JP | 2017090953 | * | 5/2017 | ............. G08B 25/00 |

OTHER PUBLICATIONS

U.S. Appl. No. 17/463,107; First Named Inventor: Yasunobu Yamauchi; Title: "Load Estimatation Apparatus and Method"; filed Aug. 31, 2021.

* cited by examiner

*Primary Examiner* — Amara Abdi
(74) *Attorney, Agent, or Firm* — Holtz, Holtz & Volek PC (57) ABSTRACT

According to one embodiment, an information processing apparatus includes processing circuitry. The processing circuitry acquires image data on a predetermined photographed area, generates part movement information on a plurality of parts of an object included in the image data, based on the image data, acquires sensor data from the object, generates sensor operation information on an operation of a sensor, based on the sensor data, and specifies a relationship between the object included in the image data and the sensor, based on the part movement information and the sensor operation information.

8 Claims, 11 Drawing Sheets

| Tracking ID | Movement locus ID |
|---|---|
| c1001 | lo1 |
| c1001 | lo2 |
| c1002 | lo3 |
| c1002 | lo4 |

FIG. 9

| Sensor ID | User ID |
|---|---|
| s1001 | u1001 |
| s1002 | u1002 |

| Movement locus ID | Sensor ID | Sensor axis | Correlation value | |
|---|---|---|---|---|
| lo1 | s1001 | X axis | 0 | ~1310 |
| lo1 | s1001 | Y axis | 0.4 | |
| lo1 | s1001 | Z axis | 0.9 | ~1320 |
| lo2 | s1001 | X axis | 0 | |
| ⋮ | ⋮ | ⋮ | ⋮ | |
| lo3 | s1002 | Y axis | 0.9 | ~1330 |
| ⋮ | ⋮ | ⋮ | ⋮ | |
| lo4 | s1002 | Z axis | 0.1 | |

ID
INFORMATION PROCESSING APPARATUS SPECIFYING A RELATIONSHIP BETWEEN A SENSOR AND AN OBJECT INCLUDED IN IMAGE DATA, AND METHOD AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2021-037437, filed Mar. 9, 2021, the entire contents of which are incorporated herein by reference.

FIELD

Embodiments described herein relate generally to an information processing apparatus, a method, and a non-transitory computer-readable storage medium.

BACKGROUND

There are an increasing number of cases where the behavior of a worker is recorded as a moving image at a manufacturing site by using a photographing device such as a camera and the recorded moving image is used to improve the work efficiency. In such cases, the worker shown in the moving image should be identified, and there is known a technique for identifying the worker by analyzing the clothes and face of the worker. At the manufacturing site, however, it is often the case that a number of workers wear similar work clothes and wear helmets. Since the faces of the workers cannot be clearly recognized, the technique mentioned above does not enable the workers to be identified.

There is also known a technique for identifying a person, based on a moving image recorded by a photographing device and data (sensor data) measured by an acceleration sensor of a mobile terminal the person in the moving image carries. In this technique, the person is identified by checking the matching between the walking pitch and phase of the person analyzed from the moving image and the walking pitch and phase of the person acquired from the sensor data. In this technique, however, the accuracy of matching may decrease because the position of the sensor changes depending on the position where the mobile terminal is worn. Therefore, there is a demand for a technique for accurately matching the person shown in the moving image data and the person indicated by the sensor data without reference to the position of the sensor.

DETAILED DESCRIPTION

In general, according to one embodiment, an information processing apparatus includes processing circuitry. The processing circuitry acquires image data on a predetermined photographed area, generates part movement information on a plurality of parts of an object included in the image data, based on the image data, acquires sensor data from the object, generates sensor operation information on an operation of a sensor, based on the sensor data, and specifies a relationship between the object included in the image data and the sensor, based on the part movement information and the sensor operation information.

Embodiments of an information processing apparatus will now be described in detail with reference to the accompanying drawings.

First Embodiment

Figure 1:
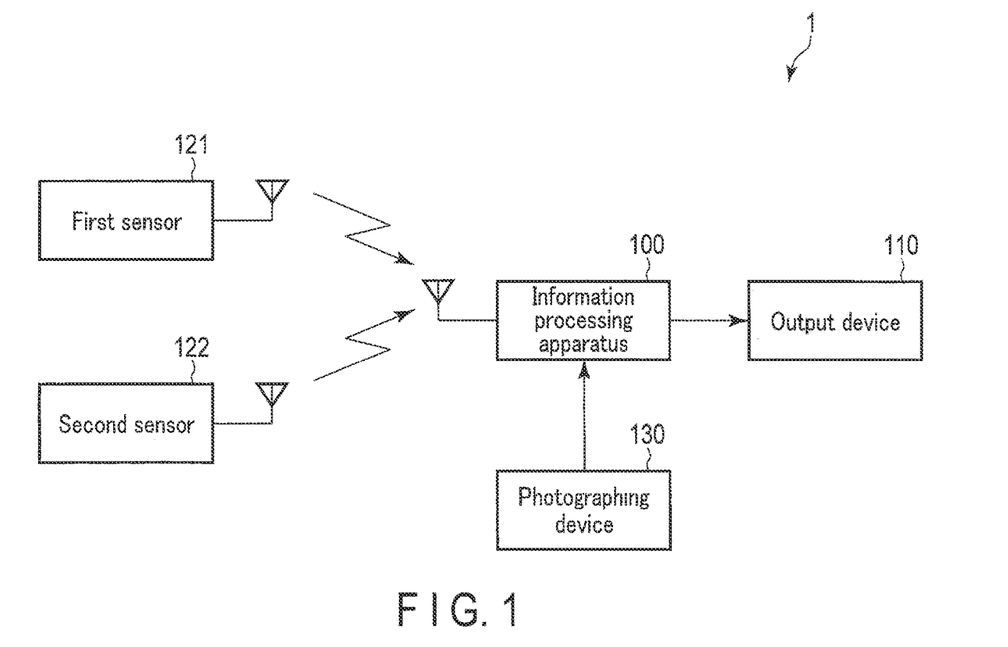
FIG. 1 is a block diagram illustrating the configuration of an information processing system including an information processing apparatus according to a first embodiment.

FIG. 1 is a block diagram illustrating the configuration of an information processing system 1 including an information processing apparatus 100 according to the first embodiment. The information processing system 1 includes an information processing apparatus 100, an output device 110, a plurality of sensors and a photographing device 130. In FIG. 1, a first sensor 121 and a second sensor 122 are illustrated as the plurality of sensors. Each of the plurality of sensors generates sensor data on one of a plurality of measurement targets, for example. The measurement targets are, for example, workers working at a manufacturing site. For example, the first sensor 121 and the second sensor 122 are assigned to different workers. The photographing device 130 photographs the manufacturing site, for example. The information processing apparatus 100 identifies a plurality of workers shown in image data, based on the plurality of sensor data acquired for each of the plurality of workers and image data in which the plurality of workers are shown. The output device 110 displays display data including information on a plurality of specified workers.

Where the first sensor 121 and the second sensor 122 need not be distinguished, they will be hereinafter referred to simply as "sensors".

The output device 110 is, for example, a monitor. The output device 110 receives display data from the information processing apparatus 100. The output device 110 displays the display data. The output device 110 is not limited to the monitor as long as the display data can be displayed. For example, the output device 110 may be a projector. Further, the output device 110 may include a speaker.

The sensor is incorporated, for example, in a wearable device worn a body part of a measurement target. The body part is, for example, a wrist, an upper arm, an ankle, an upper leg, a hip, a back or a head. The sensor may be incorporated in the mobile terminal possessed by the measurement target. In this case, the mobile terminal may be carried, for example, in the palm of the measurement target, the chest pocket of the jacket and a pocket of the trousers. In the description below, the wearable device or mobile terminal and the sensor will be used as referring to the same element.

It is assumed that the pocket provided on the clothes is associated with the body part of the measurement target. For example, the chest pocket of the jacket corresponds to the body part "chest", and the pocket of trousers corresponds to the body part "upper leg". The body part may be simply referred to as a "part".

The sensor measures at least one kind of physical state and generates sensor data including measured data (measurement data). The measurement data is, for example, acceleration data, angular velocity data, geomagnetic data, atmospheric pressure data, temperature/humidity data, myoelectric potential data or pulse wave data. Specifically, the sensor generates sensor data, including at least acceleration data. The altitude of the sensor can be estimated by using the atmospheric pressure data.

The measurement data may include a plurality of channels. For example, where the measurement data is acceleration data, the sensor data includes measurement data for 3 channels (3 axes) corresponding to the direction components (e.g., X-axis direction, Y-axis direction and Z-axis direction) of acceleration. In connection with the present embodiment, a description will be given of the case where the first sensor 121 and the second sensor 122 are used as the plurality of sensors.

The first sensor 121 is incorporated, for example, in a mobile terminal, and is put in a chest pocket of the measurement target. The first sensor 121 measures a movement of the measurement target and generates first sensor data including measurement data. The first sensor 121 outputs the first sensor data to the information processing apparatus 100. The first sensor data is associated with a sensor ID for identifying the first sensor 121.

The second sensor 122 is incorporated, for example, in a mobile terminal, and is put in a pocket of the trousers (trouser pocket) of the measurement target. The second sensor 122 measures another movement of the measurement target and generates second sensor data including measurement data. The second sensor 122 outputs the second sensor data to the information processing apparatus 100. The second sensor data is associated with a sensor ID for identifying the second sensor 122.

Where the first sensor data and the second sensor data need not be distinguished, they will be hereinafter referred to simply as "sensor data".

The photographing device 130 is, for example, an image sensor. The photographing device 130 photographs a predetermined area. (for example, a manufacturing site) and acquires a moving image. In the present embodiment, the moving image data acquired by the photographing device 130 will be referred to as image data. The photographing device 130 outputs the acquired image data to the information processing apparatus 100. The photographing device 130 may be a video camera.

Figure 2:
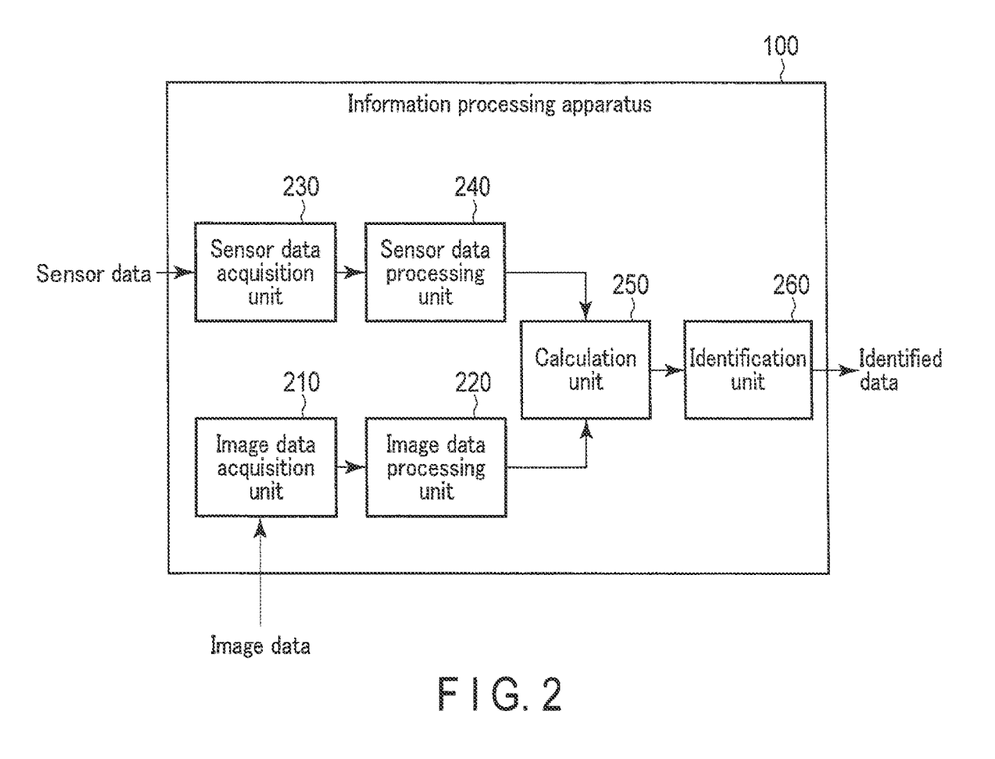
FIG. 2 is a block diagram illustrating the configuration of the information processing apparatus according to the first embodiment.

FIG. 2 is a block diagram illustrating the configuration of the information processing apparatus 100 according to the first embodiment. The information processing apparatus 100 includes an image data acquisition unit 210 (first acquisition unit), an image data processing unit 220 (first processing unit), a sensor data acquisition unit 230 (second acquisition unit), and sensor data processing unit 240 (second processing unit), a calculation unit 250 and an identification unit 260.

The information processing apparatus 100 may include a memory and a processor (neither is shown). The memory stores, for example, various programs related to the operation of the information processing apparatus 100 (for example, a worker identifying program that identifies a worker). The processor executes the various programs stored in the memory to realize the functions of the image data acquisition unit 210, the image data processing unit 220, the sensor data acquisition unit 230, the sensor data processing unit 240, the calculation unit 250 and the identification unit 250.

The image data acquisition unit 210 acquires image data from the photographing device 130. The image data acquisition unit 210 outputs the acquired image data to the image data processing unit 220. The image data acquisition unit 210 may associate the acquired image data with an acquisition time.

The image data processing unit 220 receives image data from the data acquisition unit 210. Based on the image data, the image data processing unit 220 generates part movement information related to the movements of a plurality of parts of an object (e.g., an operator) included in the image data. The image data processing unit 220 outputs the part movement information to the calculation unit 250.

The part movement information includes information on the movement loci of a plurality of parts of the operator (movement locus information). For example, where the number of parts of a worker to which attention is paid is two and two workers are shown in the image data, the part movement information includes four movement locus information. The movement locus information for example, information in which the acquisition time of the image data and the two-dimensional coordinates indicating the position of the part of the worker in the image data are associated with each other. The movement locus information may be assigned with a movement locus ID for identifying each of a plurality of movement loci.

Specifically, the image data processing unit 220 executes a person detection process for detecting persons in the image data, and assigns a tracking ID to all workers detected in the image data. Next, the image data processing unit 220 executes a posture estimation process for estimating postures of the detected persons, and applies a human skeleton model of two dimensions (two-dimensional human skeleton model) to each of the workers to whom the tracking ID is assigned. Next, the image data processing unit 220 executes a person tracking process for tracking the detected persons, and acquires movement locus information on the parts of the two-dimensional human skeleton model corresponding to a plurality of parts of the workers who are being tracked. The image data processing unit 220 may assign a movement locus ID to the movement locus information and associate the assigned movement locus ID with the tracking ID.

A plurality of parts of the workers may be determined in advance, may be determined based on a device incorporating a sensor, or may be determined based on the user's designation. For example, if the sensor is mounted on a wristband type wearable device, the mounting position is limited. In this case, the image data processing unit 220 may set "wrist" or "arm" as a plurality of parts.

The sensor data acquisition unit 230 acquires sensor data from sensors worn on or possessed by a worker. Specifically, the sensor data acquisition unit 230 acquires first sensor data from the first sensor 121 and second sensor data from the second sensor 122. The sensor data acquisition unit 230 outputs the acquired first sensor data and second sensor data to the sensor data processing unit 240. The sensor data acquisition unit 230 may associate the acquired sensor data with acquisition times.

The sensor data processing unit 240 receives the sensor data from the sensor data acquisition unit 230. Specifically, the sensor data processing unit 240 receives the first sensor data and the second sensor data. The sensor data processing unit 240 generates sensor operation information regarding the operations of the sensors, based on the first sensor data and the second sensor data. The sensor data processing unit 240 outputs the sensor operation information to the calculation unit 250.

The sensor operation information includes time-series information (sensor time-series information) for each channel of measurement data included in the sensor data. For example, where sensor data including measurement data for three channels is acquired for one sensor and sensor data is acquired from each of the two sensors, the sensor operation information includes six sensor time series information. The sensor time-series information is, for example, information in which the acquisition times of the measurement data and the measurement values of the measurement data are associated. The sensor time-series information may be associated with sensor IDs.

The sensor data processing unit 240 may generate sensor operation information, after removing high-frequency components from the measurement data included in the sensor data and performing a predetermined operation. The removal of noise components is, for example, a process using a low-pass filter. The predetermined operation is, for example, an integral operation. Where the measurement data represents acceleration, the sensor data processing unit 240 may generate sensor time-series information on a speed by executing an integral operation on the measurement data.

The calculation unit 250 receives the part movement information from the image data processing unit 220 and receives the sensor operation information from the sensor data processing unit 240. The calculation unit 250 calculates a correlation value between the movement locus information and the sensor time-series information, based on the part movement information and the sensor operation information. The calculation unit 250 outputs the calculated correlation value, i.e., a calculation result, to the identification unit 260.

Specifically, the calculation unit 250 calculates a correlation value by calculating a cross-correlation for all combinations of the plurality of movement locus information and the plurality of sensor time-series information. For example, the cross-correlation C(A,B) of two one-dimensional signals A[t] and B[t] (t=0, ..., T−1) can be calculated using the following mathematical formula (1):

$$C(A, B) = \frac{1}{T}\sum_{t=0}^{T-1} A[t]B[t] / \sqrt{\frac{1}{T}\sum_{t=0}^{T-1} A[t]^2 \cdot \frac{1}{T}\sum_{t=0}^{T-1} B[t]} \quad (1)$$

In formula (1), where the correlation between the two one-dimensional signals A[t] and B[t] is high, the absolute value of the cross-correlation C(A,B) is close to 1. On the other hand, where the correlation is low, the absolute value is close to zero. The movement locus information is a two-dimensional signal in which the time and the two-dimensional coordinates of the image are associated with each other. Therefore, where the correlation value is calculated, the calculation unit 250 calculates a correlation value with the sensor time-series information, for each of the coordinate axes (e.g., the X axis and the Y axis) of the two-dimensional coordinates, and outputs the larger correlation value as a calculation result.

The calculation unit 250 may calculate a correlation value for combinations which are included among all combinations of the plurality of movement locus information and the plurality of sensor time-series information and which have a high degree of similarity on the time axis. Specifically, the calculation unit 250 determines that the similarity is high where both the value of the movement locus information and the value of the sensor time-series information fluctuate at a certain time. For example, where one worker stands still and the other worker keeps walking, and the value of the sensor data fluctuates, indicating walking, the calculation unit 250 calculates a correlation value with respect to the other worker. Thus, the calculation unit 250 can narrow down the combinations for which the correlation value is calculated, so that the amount of calculation can be reduced.

The identification unit 260 identifies the relationship between the worker included in the image data and the sensor, based on the part movement information and the sensor operation information. Specifically, the identification unit 260 receives a calculation result from the calculation unit 250. Based on the calculation result, the identification unit 260 determines a combination of the movement locus ID and the sensor ID in descending order of the correlation value, and associates the movement locus ID and the user ID, thereby identifying the relationship between the worker included in the image data and the sensor.

In the above, the configurations of the information processing system 1 and the information processing apparatus 100 according to the first embodiment have been described. Next, a description will be given of an example in which the information processing apparatus 100 operates and an example in which the information processing apparatus 100 is put to practical use.

Figure 3:
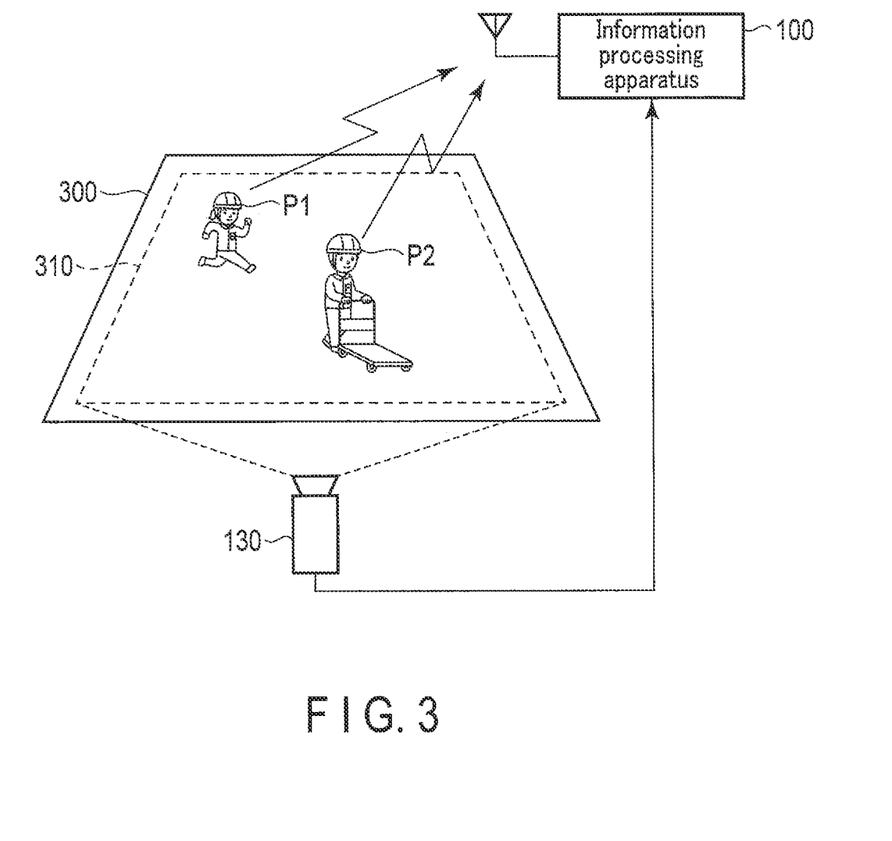
FIG. 3 is an explanatory diagram illustrating an example of how the information processing apparatus according to the first embodiment is put to practical use.

FIG. 3 is an explanatory diagram illustrating how the information processing apparatus 100 according to the first embodiment is put to practical use. FIG. 3 shows the information processing apparatus 100, a work area 300 which is a manufacturing site, two workers P1 and P2 working in the work area 300 and a photographing device 130 which photographs the work area 300.

The photographing device 130 outputs image data on a photographing area 310, which substantially includes the work area 300, to the information processing apparatus 100.

The sensors worn on or carried by the two workers P1 and P2 output measured sensor data to the information processing apparatus 100.

In the specific example to be mentioned below, two workers P1 and P2 included in the image data acquired from one photographing device 130 are identified, as shown in FIG. 3. The two workers are indicated by the reference symbols P1 and P2 for convenience of description, but this does not identify the workers in the image data.

Figure 4:
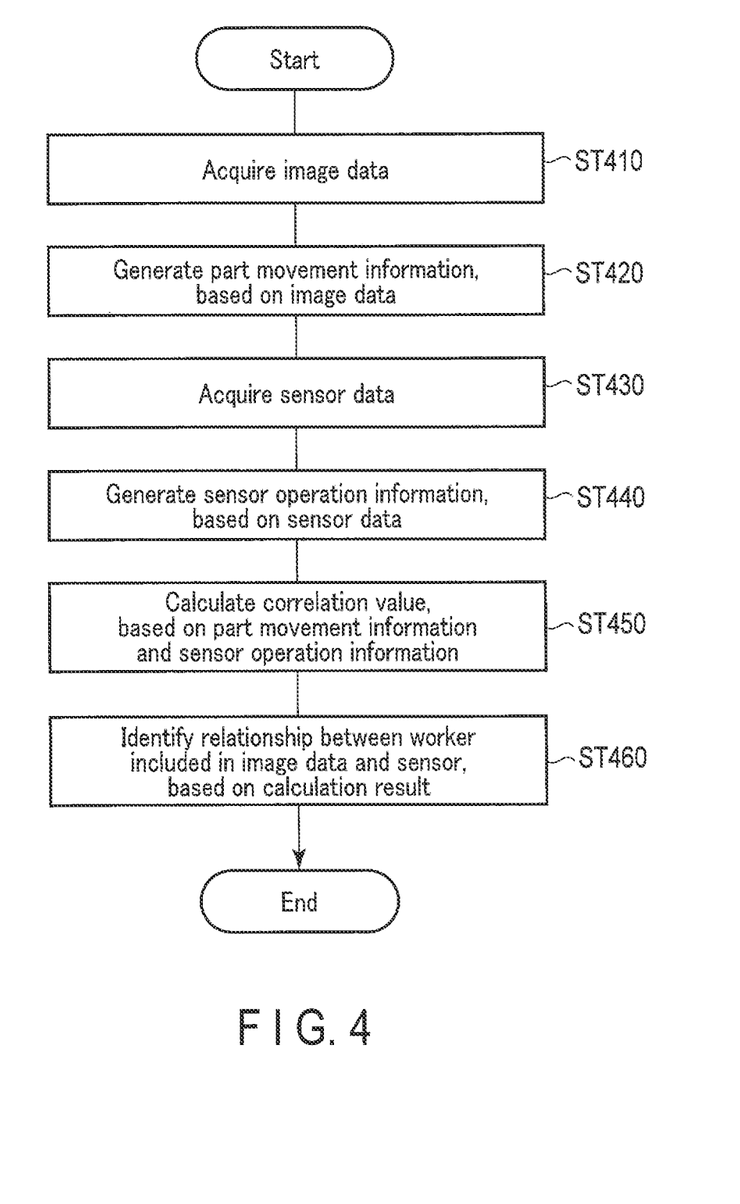
FIG. 4 is a flowchart illustrating an example of how the information processing apparatus according to the first embodiment operates.

FIG. 4 is a flowchart illustrating an example of how the information processing apparatus 100 according to the first embodiment operates. The processing illustrated in the flowchart of FIG. 4 starts when the user executes the worker identification program.

(Step ST410)

When the worker identification program is executed, the image data acquisition unit 210 acquires image data from the photographing device 130.

(Step ST420)

After the image data is acquired, the image data processing unit 220 generates part movement information, based on the image data. In the description below, the generation of the part movement information will be described with reference to FIGS. 5 to 9.

Figure 5:
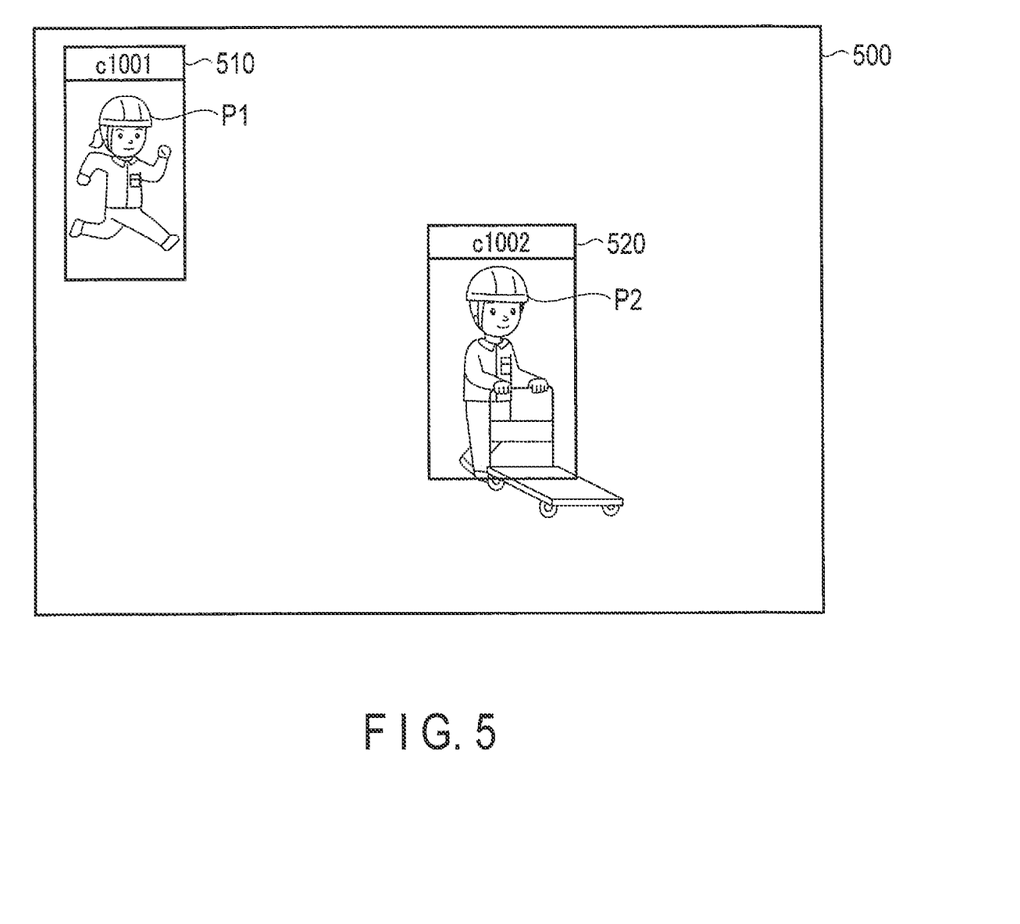
FIG. 5 is a diagram illustrating image data used in the first embodiment.

FIG. 5 is a diagram illustrating image data 500 used in the first embodiment. The image data 500 shows two workers P1 and P2.

The image data processing unit 220 executes a person detection process on the image data 500, and sets a detection area 510 including the worker P1 and a detection area 520 including the worker P2. The image data processing unit 220 assigns the tracking ID "c1001" to the Worker P1 in the detection area 510, and assigns the tracking ID "c1002" to the worker P2 in the detection area 520. At this time, the image data processing unit 220 assigns the tracking IDs to the workers, for example, in the order in which the workers are detected.

Next, the image data processing unit 220 executes a posture estimation process for the workers in the detection areas, and applies a two-dimensional human skeleton model to each of the detected workers. In the two-dimensional human skeleton model, a plurality of key points of the human body are associated with two-dimensional coordinates in the image data.

Figure 6:
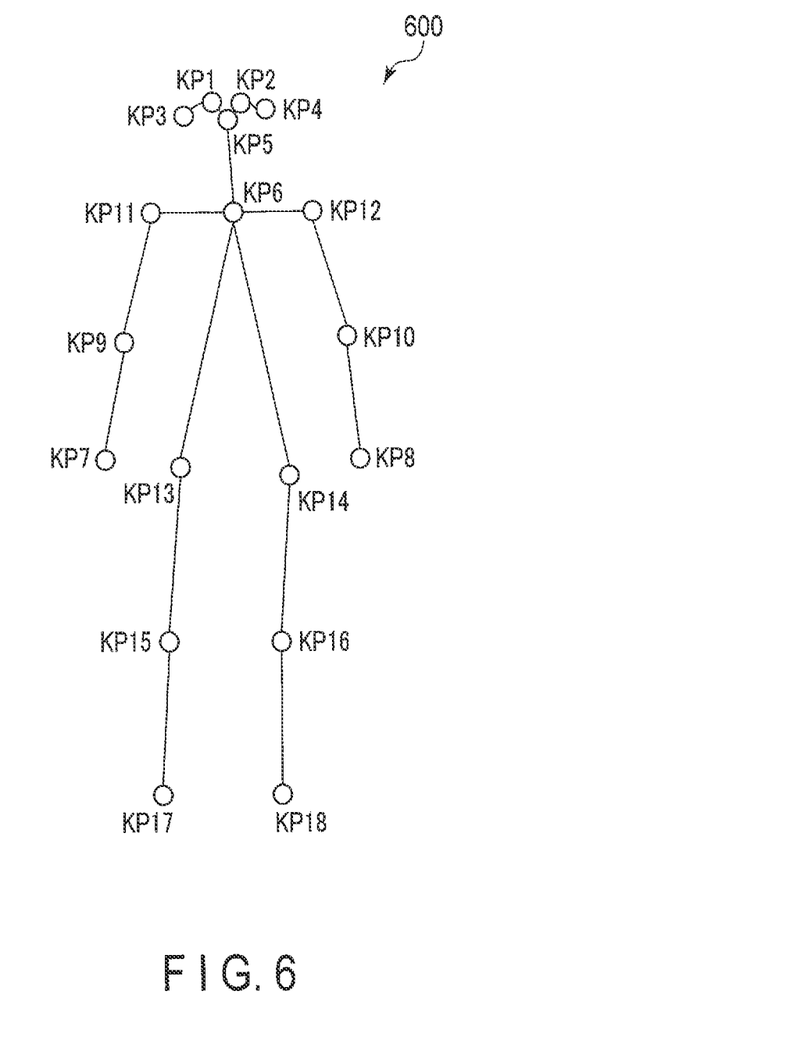
FIG. 6 is a diagram illustrating a two-dimensional human skeleton model used in the first embodiment.

FIG. 6 is a diagram illustrating a two-dimensional human skeleton model 600 according to the first embodiment. The two-dimensional human skeleton model 600 is represented, for example, by 18 key points KP1 to KP18 of the human body on the two-dimensional coordinates. Where the two-dimensional human skeleton model 600 is facing the front, the key points KP1 to KP18 respectively correspond to "right eye", "left eye", "right ear", "left ear", "nose", "neck", "right hand", "left hand", "right elbow", "left elbow", "right shoulder", "left shoulder", "right waist", "left waist", "right knee", "left knee", "right foot" and "left foot". By associating these key points with the parts of a worker, the image data processing unit 220 can pay attention to the part where the sensor is worn or possessed.

Next, the image data processing unit 220 executes a person tracking process on the detected worker, and acquires movement locus information on the parts of the two-dimensional human skeleton model corresponding to the parts of the worker. For example, where attention is paid to the left chest pocket of the worker, the image data processing unit 220 acquires a movement locus based on the key point KP12. For example, where attention is paid to the pocket on the right side of the worker's trousers (hereinafter referred to as the trouser pocket), the image data processing unit 220 acquires a movement locus based on the key point KP13. A part to which attention is paid may be determined in an arbitrary manner.

Figure 7:
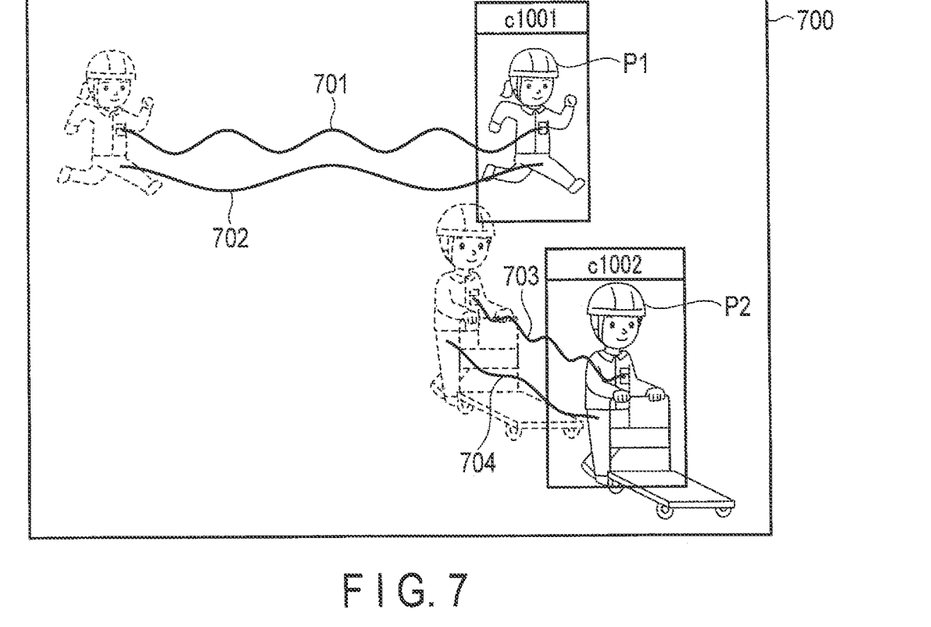
FIG. 7 is a diagram illustrating image data on which movement loci of various parts of the body are superimposed in the first embodiment.

FIG. 7 is a diagram illustrating image data 700 on which the movement loci of parts of the body are superimposed in the first embodiment. It should be noted here that the acquisition time of the image data 700 is after the acquisition time of the image data 500. Therefore, the movement loci superimposed on the image data 700 indicate how the parts set for the workers P1 and P2 move from the acquisition time of the image data 500 to the acquisition time of the image data 700.

In the image data 700, the movement locus 701 indicates how the left chest pocket of the worker P1 moves, the movement locus 702 indicates how the trouser pocket of the worker P1 moves, the movement locus 703 indicates how the left chest pocket of the worker P2 moves, and the movement locus 704 indicates how the trouser pocket of the worker P2 moves.

Figure 8:
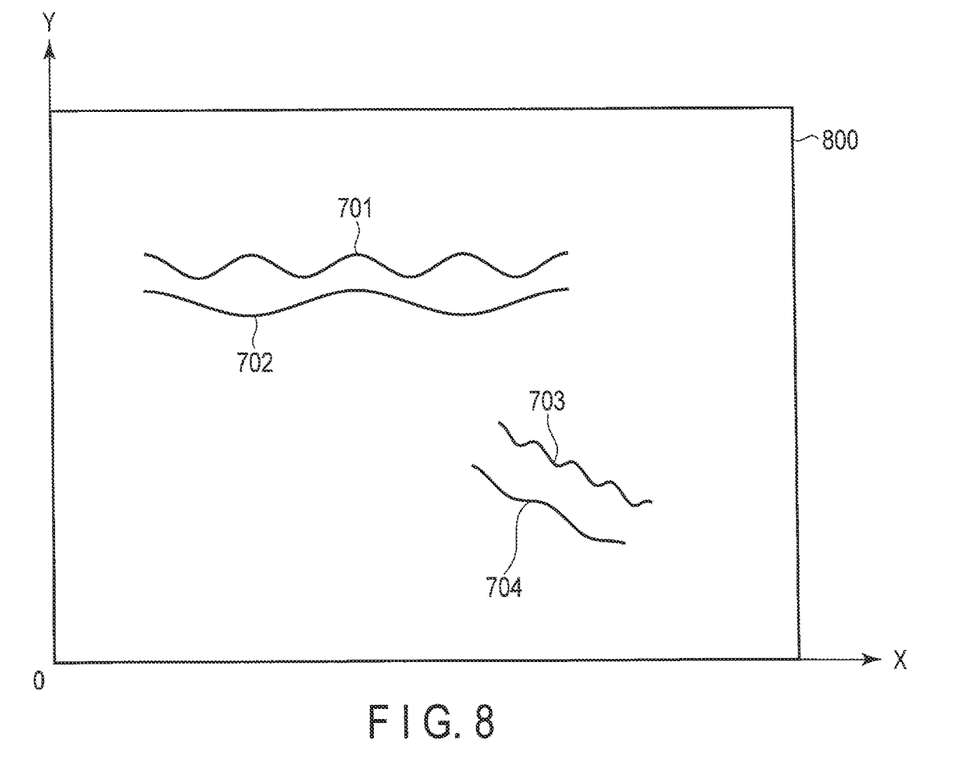
FIG. 8 is a diagram illustrating coordinate data on the movement loci in the first embodiment.

FIG. 8 is a diagram illustrating the coordinate data 800 on the movement loci in the first embodiment. In the coordinate data 800, four movement loci 701 to 704 superimposed on the image data 700 are plotted on XY coordinates. The X-axis and the Y-axis correspond to the horizontal and vertical directions of the image data, respectively. Therefore, a movement locus can be represented by two-dimensional coordinates (X[I] [k] [t], Y[I] [k] [t]). "I" indicates the tracking ID, "k" indicates the position (key point) of a part, and "t" indicates the acquisition time of image data. For example, the two-dimensional coordinates (X[c1001] [KP12] [t], Y[c1001] [KP12] [t]) represent where the coordinate position of the key point KP12 of the tracking ID "c1001" is at the acquisition time t.

As described above, the image data processing unit 220 acquires movement loci during a predetermined time and generates part movement information. At this time, the image data processing unit 220 assigns movement locus IDs "lo1" to "lo4" corresponding to the movement loci 701 to 704. In the description below, the movement locus IDs associated with the tracking IDs will be described with reference to FIG. 9.

Figure 9:
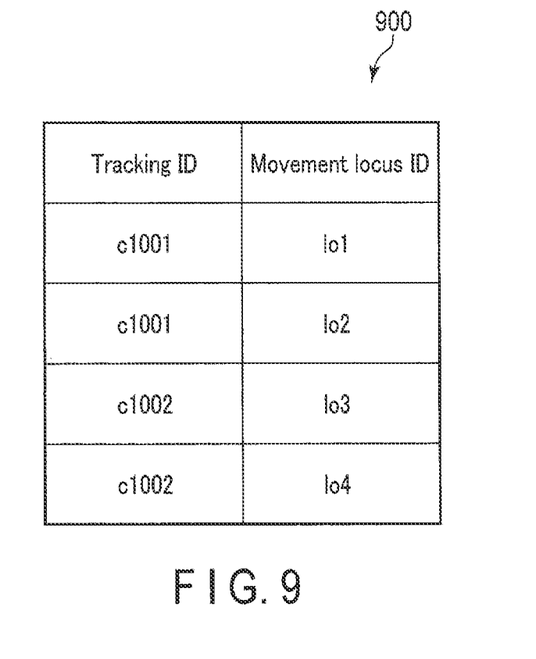
FIG. 9 is a table illustrating how tracking IDs and movement locus IDs are associated in the first embodiment.

FIG. 9 is a table 900 illustrating how the tracking IDs and the movement locus IDs are associated in the first embodiment. The table 900 associates the tracking IDs with the movement locus IDs. For example, the tracking ID "c1001" is associated with the movement locus ID "lo1" and the movement locus ID "lo2", and the tracking ID "c1002" is associated with the movement locus ID "lo3" and the movement locus ID "lo4".

(Step ST430)

After the part movement information is generated, the sensor data acquisition unit 230 acquires sensor data from the sensors worn on or possessed by the workers. Specifically, as shown in FIG. 3, the sensor data acquisition unit 230 acquires sensor data from the sensor worn on or possessed by the worker P1 (the sensor of the worker P1) and from the sensor worn on or possessed by the worker P2 (the sensor of the worker P2). In the description below, the sensor IDs and the user IDs associated with the sensor data will be described with reference to FIG. 10.

Figure 10:
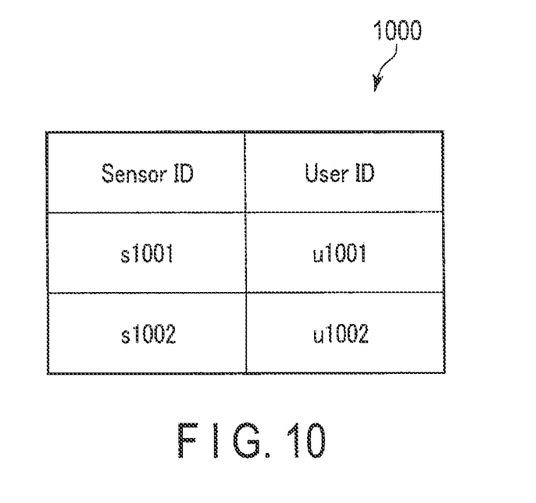
FIG. 10 is a table illustrating how sensor IDs and user IDs are associated in the first embodiment.

FIG. 10 is a table 1000 illustrating how the sensor IDs and the user IDs are associated in the first embodiment. The table 1000 associates the sensor IDs with the user IDs. For example, the sensor ID "s1001" is associated with the user ID "u1001", and the sensor ID "s1002" is associated with the user ID "u1002".

A specific description will be given of the case where a sensor is incorporated in a mobile terminal. The sensor incorporated in the mobile terminal outputs measurement values as sensor data for each of the coordinate axes, for example, according to a coordinate system using the center of the mobile terminal as reference. In the description below, the coordinate axes of the mobile terminal and the waveforms of the sensor data will be described with reference to FIGS. 11 and 12.

Figure 11:
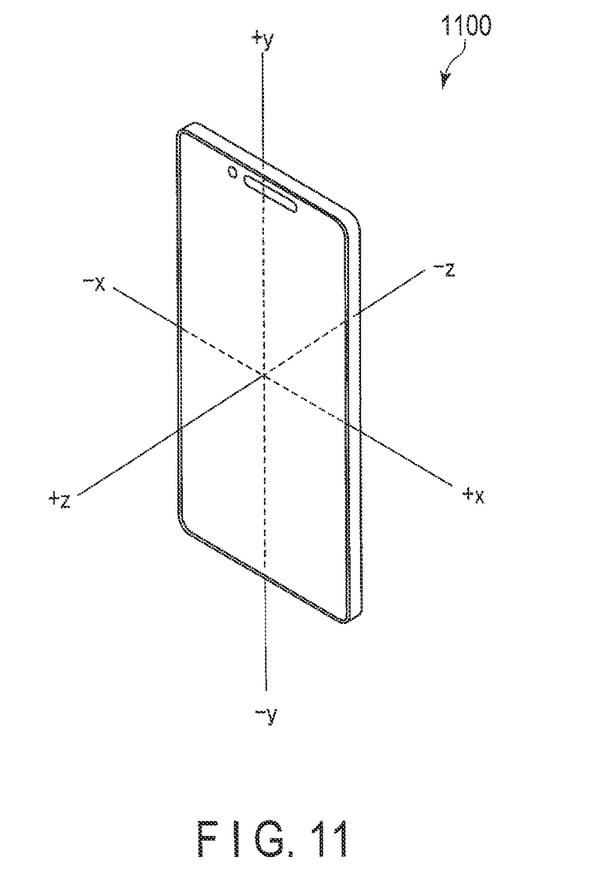
FIG. 11 is a diagram illustrating coordinate axes of a mobile terminal incorporating a sensor used in the first embodiment.

FIG. 11 is a diagram illustrating the coordinate axes of a mobile terminal 1100 incorporating a sensor used in the first embodiment. In the mobile terminal 1100, for example, the X-axis and the Y-axis are determined with respect to the horizontal direction of the display, and the Z-axis is determined with respect to the vertical direction of the display. Where the mobile terminal 1100 incorporates an acceleration sensor, the sensor detects acceleration in the X-axis, Y-axis and Z-axis directions.

Figure 12:
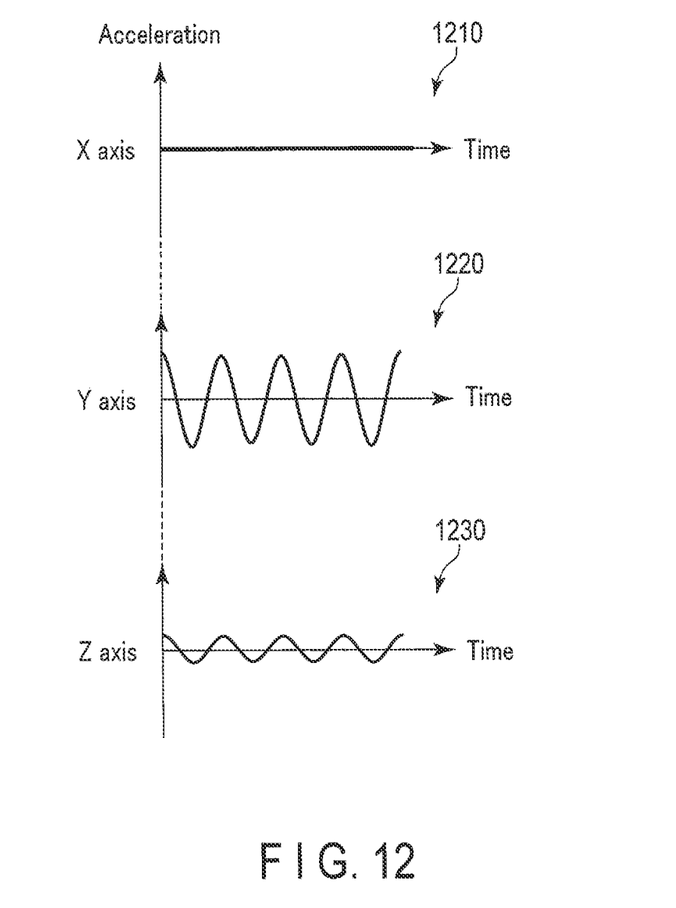
FIG. 12 is a diagram illustrating waveforms of sensor data used in the first embodiment.

FIG. 12 is a diagram illustrating waveforms of sensor data used in the first embodiment. In FIG. 12, waveforms 1210, 1220 and 1230 are shown with respect to the X-axis, Y-axis and Z-axis, respectively. It is assumed that the sensor data shown in FIG. 12 is detected by the sensor incorporated in the mobile terminal 1100 shown in FIG. 11.

Where the sensor data in FIG. 12 is acceleration data, the moving direction of the sensor is shown in the waveform. For example, the waveform 1210 indicates acceleration which is substantially zero along the time direction, the waveform 1220 indicates acceleration which periodically changes along the time direction, and the waveform 1230 indicates acceleration which periodically changes along the time direction. Therefore, it can be seen that the sensor is moving in the Y-axis direction or the Z-axis direction. Further, if the moving direction of the sensor is the moving direction of the mobile terminal 1100, it can be seen that the mobile terminal 1100 is moving in the Y-axis direction or the Z-axis direction.

(Step ST440)

After the sensor data is acquired, the sensor data processing unit 240 generates sensor operation information, based on the sensor data. Specifically, the sensor data processing unit 240 generates sensor operation information, based on the sensor data that are output from the sensor of the worker P1 and the sensor of the worker P2. The sensor operation information are, for example, six time-series information including time-series information regarding the three axes of the sensor of the worker P1 and time-series information regarding the three axes of the sensor of the worker P2.

The process of step ST430 and the process of step ST440 may be performed before the process of step ST410, or may be performed together with the process of step ST410 and the process of step ST420.

(Step ST450)

After the sensor operation information are generated, the calculation unit 250 calculates a correlation value, based on the part movement information and the sensor operation information. Specifically, the calculation unit 250 calculates a correlation value for all combinations of the movement locus information associated with the movement locus IDs and the sensor time-series information associated with the sensor IDs. In the description below, combinations of the movement locus IDs and the sensor IDs will be described with reference to FIG. 13.

Figure 13:
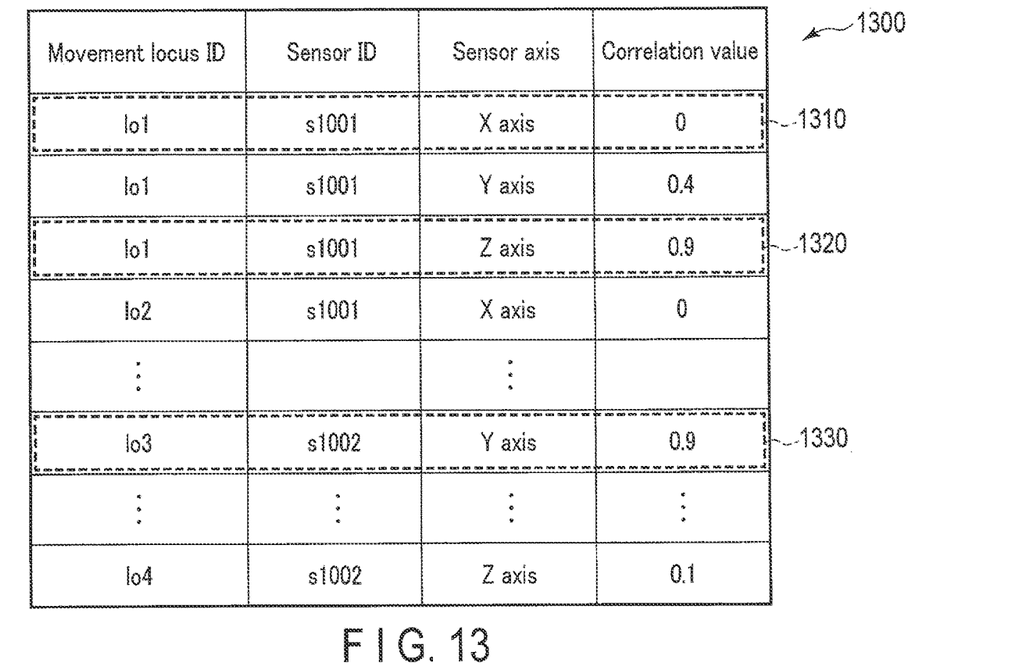
FIG. 13 is a table illustrating how the movement locus IDs, the sensor IDs, the sensor axes and correlation values are associated in the first embodiment.

FIG. 13 is a table 1300 illustrating how the movement locus IDs, the sensor IDs, the sensor axes and the correlation values are associated in the first embodiment. Table 1300 associates the movement locus IDs, the sensor IDs, the sensor axes and the correlation values. Sensor time-series information is uniquely determined by the combination of a sensor ID and a sensor axis. The table 1300 has, for example, a total of 24 combinations (number of rows) as combinations of four movement loci, two sensors and three sensor axes. The table may be a table in which the column of axes is not provided and the movement locus IDs, the sensor IDs and the correlation values are associated with each other. In this case, the item of the correlation value shows a value having the largest correlation value among the sensor axes.

For example, in the row 1310 of the table 1300, the movement locus ID "lo1", the sensor ID "s1001", the sensor axis "X axis" and the correlation value "0" are associated with each other. Since the combination of the row 1310 has a correlation value of "0", it can be seen that the movement locus information associated with the movement locus ID "lo1" has a low correlation with the sensor time-series information on the sensor axis "X axis" of the sensor ID "s1001".

For example, in the row 1320 of the table 1300, the movement locus ID "lo1", the sensor ID "s1001", the sensor axis "Z axis" and the correlation value "0.9" are associated with each other. Since the combination of the row 1320 has a correlation value of "0.9", it can be seen that the movement locus information associated with the movement locus ID "lo1" has a high correlation with the sensor time-series information on the sensor axis "Z axis" of the sensor ID "s1001".

(Step ST460)

After the correlation value is calculated, the identification unit 260 identifies the relationship between the worker included in the image data and the sensor, based on the calculation result. Specifically, the identification unit 260 determines combinations of the movement locus ID and the sensor ID in descending order of the correlation value, from among the combinations of the movement locus information and the sensor time-series information. For example, in the example of the table 1300 shown in FIG. 13, the combination of the movement locus ID "lo1" and the sensor ID "s1001" in the row 1320 and the combination of the movement locus ID "lo3" and the sensor ID "s1002" in the row 1330 have a high correlation value. Since the sensor ID and the user ID are already associated with each other (see FIG. 10, for example), the identification unit 260 associates the movement locus ID "lo1" with the user ID "u1001" and associates the movement locus ID "lo3" with the user ID "u1002". By this association, the relationship between the worker included in the image data and the sensor can be specified.

As described above, the information processing apparatus according to the first embodiment acquires image data obtained by photographing a predetermined area, generates part movement information on movements of a plurality of parts of an object included in the image data, based on the image data, acquires sensor data from the object, generates sensor operation information on sensor operations, based on the sensor data, and specifies the relationship between the object included in image data and the sensor, based on the part movement information and the sensor operation information. Therefore, the information processing apparatus according to the first embodiment checks whether a plurality of parts of the object match the sensor data, so that a person in the moving image data and a person in the sensor data can be made to match with high accuracy without reference to the position where the sensor is worn.

Second Embodiment

In connection with the first embodiment, a description was given of the case where one photographing device is used. In connection with the second embodiment, a description will be given of the case where two photographing devices are used.

Figure 14:
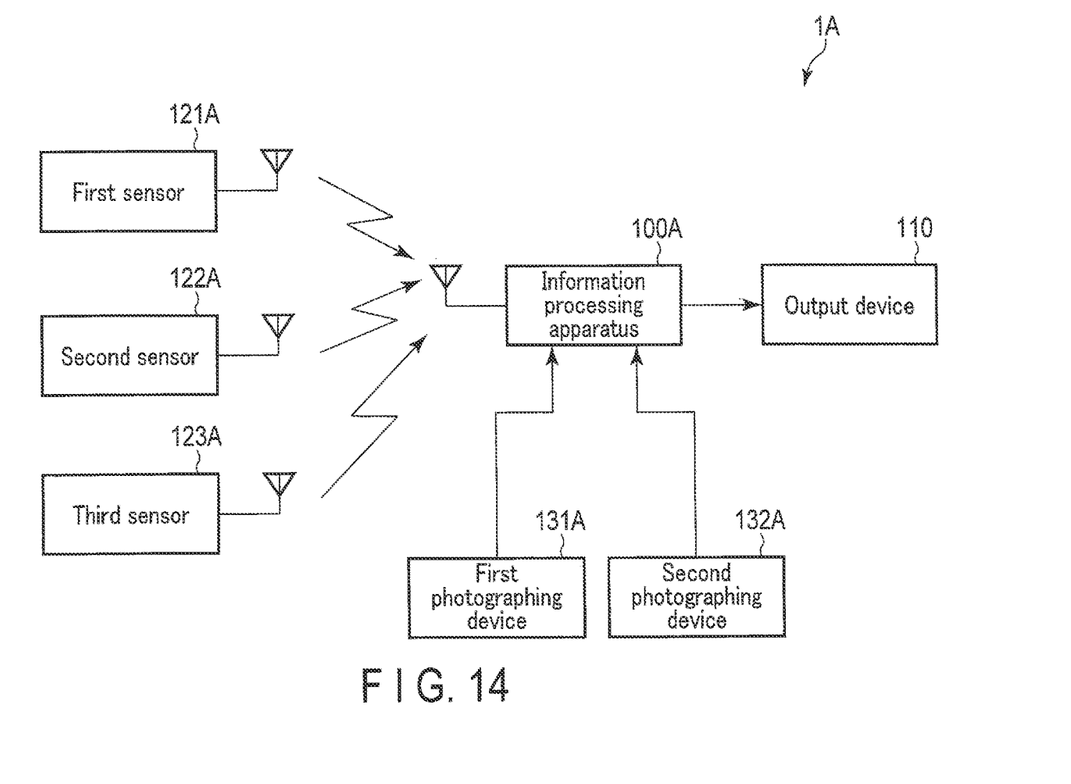
FIG. 14 is a block diagram illustrating the configuration of an information processing system including an information processing apparatus according to a second embodiment.

FIG. 14 is a block diagram illustrating the configuration of an information processing system 1A including an information processing apparatus 100A according to the second embodiment. The information processing system 1A includes an information processing apparatus 100A, an output device 110, a plurality of sensors and a plurality of photographing devices. In FIG. 14, a first sensor 121A, a second sensor 122A and a third sensor 123A are illustrated as the plurality of sensors. These sensors are assigned to different workers. In FIG. 14, first photographing device 131A and a second photographing device 132A are illustrated as the plurality of photographing devices. In the present embodiment, it is assumed that the imaging area of the first photographing device 131A and the imaging area of the second photographing device 132A do not overlap. Since the plurality of sensors and the plurality of photographing devices are similar to the sensors and photographing device of the first embodiment, the description thereof will be omitted.

The information processing apparatus 100A acquires sensor data from the first sensor 121A, the second sensor 122A and the third sensor 123A, and acquires image data from the first photographing device 131A and the second photographing device 132A. The information processing apparatus 100A generates part movement information for each image data, and calculates correlation values between each of the generated part movement information and sensor operation information, so as to specify the relationships between the workers included in each image data and the sensors.

Figure 15:
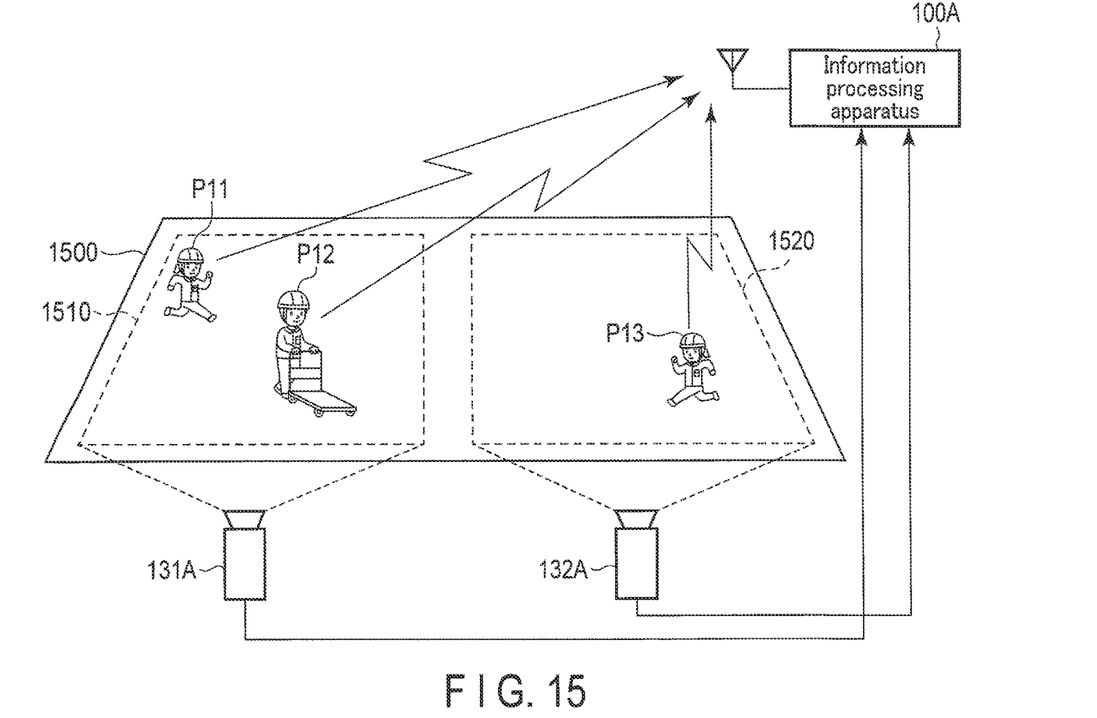
FIG. 15 is an explanatory diagram illustrating an example of how the information processing apparatus according to the second embodiment is put to practical use.

FIG. 15 is an explanatory diagram illustrating how the information processing apparatus 100A according to the second embodiment is put to practical use. FIG. 15 shows the information processing apparatus 100A, a work area 1500 which is a manufacturing site, three workers P11, P12 and P13 working in the work area 1500, and a first photographing device 131A and a second photographing device 132A that photograph the work area 1500 without overlaps.

The first photographing device 131A outputs first image data on a photographing area 1510, which substantially includes the left half of the work area 1500, to the information processing apparatus 100A. The second photographing device 132A outputs second image data on the photographing area 1520, which substantially includes the right half of the work area 1500, to the information processing apparatus 100A. The sensors worn on or carried by the three workers P11, P12 and P13 output measured sensor data to the information processing apparatus 100A.

In FIG. 15, two workers P11 and P12 are working in the photographing area 1510, and one worker P13 is working in the photographing area 1520. Therefore, two workers P11 and P12 are shown in the first image data, and one worker P13 is shown in the second image data. The information processing apparatus 100A performs the proces described in connection with the first embodiment, for each of the first image data and the second image data, and specifies the relationships between the workers included in the image data and the sensors.

As described above, the information processing apparatus according to the second embodiment is similar to the information processing apparatus according to the first embodiment, in that the persons in the moving image data and the persons of the sensor data can be made to patch accurately without reference to the positions of the sensors.

The information processing apparatus according to the second embodiment specifies the relationships between workers and sensors, for each of the plurality of image data, as described above. Thus, even where a person detected in the first image data moves and is detected in the second image data as well, the first image data and the second image data need not be compared with each other, and the amount of processing can be reduced, with the high matching accuracy maintained.

Other Embodiments

The information processing apparatuses according to the first embodiment and the second embodiment both perform posture estimation in two dimensions. However, the information processing apparatuses are not limited to the posture estimation performed in two dimensions, and may perform posture estimation in three dimensions (i.e., three-dimensional posture estimation). Where three-dimensional posture estimation is performed, movement locus information is a three-dimensional signal in which the time is associated with the three-dimensional coordinates of three-dimensional space. Therefore, where a correlation value is calculated, the calculation unit 250 calculates a correlation value with the sensor time-series information, for each of the coordinate axes (e.g., the X axis, Y axis and Z axis) of the three-dimensional coordinates, and outputs the largest correlation value as a calculation result.

The information processing apparatuses according to the first embodiment and the second embodiment both calculate a correlation value by using the movement locus information included in the part movement information and the sensor time-series information included in the sensor operation information as data that are close to the raw data. However, the information processing apparatuses may perform further processing on the movement locus information and the sensor time-series information.

For example, the image data processing unit 220 regards the movement locus information as time-series data, and performs normalization or feature extraction processing on the time-series data. Further, the sensor data processing unit 240 performs normalization or feature extraction processing on the sensor time-series information. The calculation unit 250 calculates a correlation value using the movement locus information and the sensor time-series information that have been subjected to the normalization or feature extraction. As described above, since the movement locus information and the sensor time-series information are further processed, the information processing apparatus can calculate a correlation value with high accuracy as compared with the case where the further processing is not performed. Therefore, the accuracy of the association performed by the subsequent identification unit 250 can be enhanced.

Figure 16:
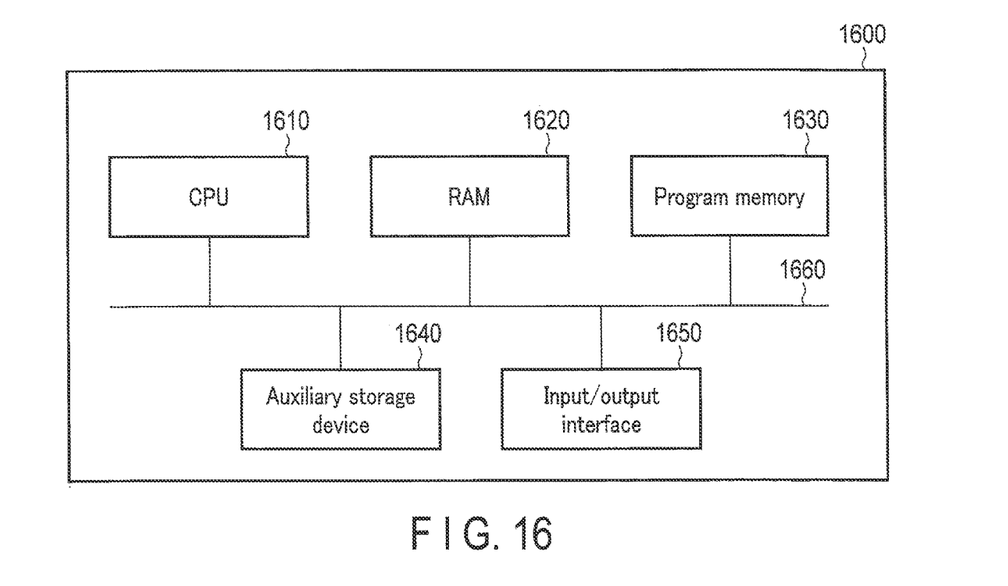
FIG. 16 block diagram illustrating a hardware configuration of a computer according to one embodiment.

FIG. 16 is a block diagram illustrating a hardware configuration of a computer according to one embodiment. The computer 1600 includes a CPU (Central Processing Unit) 1610, a RAM (Random Access Memory) 1620, a program memory 1630, an auxiliary storage device 1640 and an input/output interface 1650. These elements are provided as hardware. The CPU 1610 communicates with the RAM 1620, the program memory 1630, the auxiliary storage device 1640 and the input/output interface 1650 via a bus 1660.

The CPU 1610 is an example of a general-purpose processor. The RAM 1620 is used as a working memory by the CPU 1610. The RAM 1620 includes a volatile memory such as an SDRAM (Synchronous Dynamic Random Access Memory). The program memory 1630 stores various programs including a worker identifying program. As the program memory 1630, for example, a ROM (Read Only Memory), a portion of the auxiliary storage device 1640, or a combination of these is used. The auxiliary storage device 1640 stores data non-temporarily. The auxiliary storage device 1640 includes a nonvolatile memory such as an HDD or an SSD.

The input/output interface 1650 is an interface for coupling to or communicating with another device. The input/output interface 1650 is used for coupling or communications with the output device 110, first sensor 121, second sensor 122, and photographing device 130 which are shown in FIG. 1, and with the output device 110, first sensor 121A, second sensor 122A, third sensor 123A, first photographing device 131A and second photographing device 132A which are shown in FIG. 14. Further, the input/output interface 1650 may be used for coupling or communications with a storage device and an external device (neither is shown in FIG. 1 or 14).

Each of the programs stored in the program memory 1630 includes computer executable instructions. When the program (computer executable instruction) is executed by the CPU 1610, it causes the CPU 1610 to execute a predetermined process. For example, when the worker identification program is executed by the CPU 1610, the CPU 1610 executes a series of processes described for each step shown in FIG. 4.

The program may be provided to the computer 1600 in a state of being stored in a computer-readable storage medium. In this case, for example, the computer 1600 further includes a drive (not shown) that reads data from the storage medium, and acquires the program from the storage medium. Examples of storage media include a magnetic disk, optical disks (CD-ROM, CD-R, DVD-ROM, DVD-R, etc.), magneto-optical disks (MO, etc.) and a semiconductor memory. Alternatively, the program may be stored in a server on a communication network such that the computer 1600 can download the program from the server using the input/output interface 1650.

The processes described in connection with the embodiments are not limited to those which a general-purpose hardware processor such as a CPU 1610 executes according to a program, and may be performed by a dedicated hardware processor such as an ASIC (Application Specific Integrated Circuit). The term "processing circuit (processing unit)" covers at least one general-purpose hardware processor, at least one dedicated hardware processor, or a combination of at least one general purpose hardware processor and at least one dedicated hardware processor. In the example shown in FIG. 16, the CPU 1610, the RAM 1620 and the program memory 1630 correspond to the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising processing circuitry configured to:
   acquire image data on a predetermined photographed area;
   generate part movement information on a plurality of parts of an object included in the image data, based on the image data, the part movement information including information of movement loci of a plurality of parts of the object;
   acquire sensor data from the object;
   generate sensor operation information on an operation of a sensor, based on the sensor data, the sensor operation information including time-series information on measurement data included in the sensor data;
   calculate a correlation value between the information on movement loci and the time-series information, based on the part movement information and the sensor operation information; and
   specify a relationship between the object included in the image data and the sensor, by determining combinations of the information on movement loci and the time-series information in descending order of the correlation value.

2. The information processing apparatus according to claim 1, wherein the processing circuitry is further configured to calculate the correlation value for a combination which is one of combinations of the information on movement loci and the time-series information and which has a high degree of similarity on a time axis.

3. The information processing apparatus according to claim 1, wherein the processing circuitry is further configured to detect an object included in the image data, estimate a posture of a detected object, and track the detected object, thereby generating the part movement information.

4. The information processing apparatus according to claim 3, wherein the processing circuitry is further configured to estimate the posture by applying a human skeleton model to the detected object.

5. The information processing apparatus according to claim 1, wherein the plurality of parts are determined based on a device incorporating the sensor.

6. The information processing apparatus according to claim 5, wherein the device is a wearable device or a mobile terminal.

7. An information processing method comprising:
   acquiring image data on a predetermined photographed area;
   generating part movement information on a plurality of parts of an object included in the image data, based on the image data, the part movement information including information of movement loci of a plurality of parts of the object;
   acquiring sensor data from the object;
   generating sensor operation information on an operation of a sensor, based on the sensor data, the sensor operation information including time-series information on measurement data included in the sensor data;
   calculating a correlation value between the information on movement loci and the time-series information, based on the part movement information and the sensor operation information; and
   specifying a relationship between the object included in the image data and the sensor, by determining combinations of the information on movement loci and the time-series information in descending order of the correlation value.

8. A non-transitory computer-readable storage medium storing a program for causing a computer to execute processing comprising:
- acquiring image data on a predetermined photographed area;
- generating part movement information on a plurality of parts of an object included in the image data, based on the image data, the part movement information including information of movement loci of a plurality of parts of the object;
- acquiring sensor data from the object;
- generating sensor operation information on an operation of a sensor, based on the sensor data, the sensor operation information including time-series information on measurement data included in the sensor data;
- calculating a correlation value between the information on movement loci and the time-series information, based on the part movement information and the sensor operation information; and
- specifying a relationship between the object included in the image data and the sensor, by determining combinations of the information on movement loci and the time-series information in descending order of the correlation value.

* * * * *